United States Patent
Chen et al.

(10) Patent No.: US 8,804,639 B2
(45) Date of Patent: Aug. 12, 2014

(54) CONTROL CHANNEL RESOURCES FOR MULTI-BIT ACK/NAK

(75) Inventors: Wanshi Chen, San Diego, CA (US); Peter Gaal, San Diego, CA (US); Xiliang Luo, Cardiff, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 241 days.

(21) Appl. No.: 13/252,116

(22) Filed: Oct. 3, 2011

(65) Prior Publication Data

US 2012/0263121 A1    Oct. 18, 2012

Related U.S. Application Data

(60) Provisional application No. 61/389,678, filed on Oct. 4, 2010.

(51) Int. Cl.
    *H04W 72/04* (2009.01)

(52) U.S. Cl.
    USPC ........................................................ 370/329

(58) Field of Classification Search
    USPC ........................................ 370/328, 329, 330
    See application file for complete search history.

(56) References Cited

U.S. PATENT DOCUMENTS

2011/0243066 A1* 10/2011 Nayeb Nazar et al. ....... 370/328

FOREIGN PATENT DOCUMENTS

| JP | 2012512582 A | 5/2012 |
| WO | 2010069422 A1 | 6/2010 |

OTHER PUBLICATIONS

Huawei: "Resource allocation for uplink ACK/NACK multiplexing", 3GPP Draft; R1-104282, 3rd Generation Partnership Project (3GPP), Mobile Competence Centre ; 650, Route Des Lucioles ; F-06921 Sophia-Antipolis Cedex ; France, vol. RAN WG1, No. Madrid, Spain; Aug. 23, 2010, Aug. 17, 2010, XP050449651, [retrieved on Aug. 17, 2010].
International Search Report and Written Opinion—PCT/US2011/054792—ISA/EPO—Nov. 18, 2011.

* cited by examiner

*Primary Examiner* — Mohammad Anwar
(74) *Attorney, Agent, or Firm* — Seyfarth Shaw LLP

(57) ABSTRACT

A method of wireless communication includes receiving an upper layer configuration of multiple sets of ACK/NAK resources for uplink transmission. The receives resources correspond to at least one secondary downlink component carrier in a multicarrier configuration. The method also includes receiving a physical layer indicator of ACK/NAK resources in the sets.

32 Claims, 10 Drawing Sheets

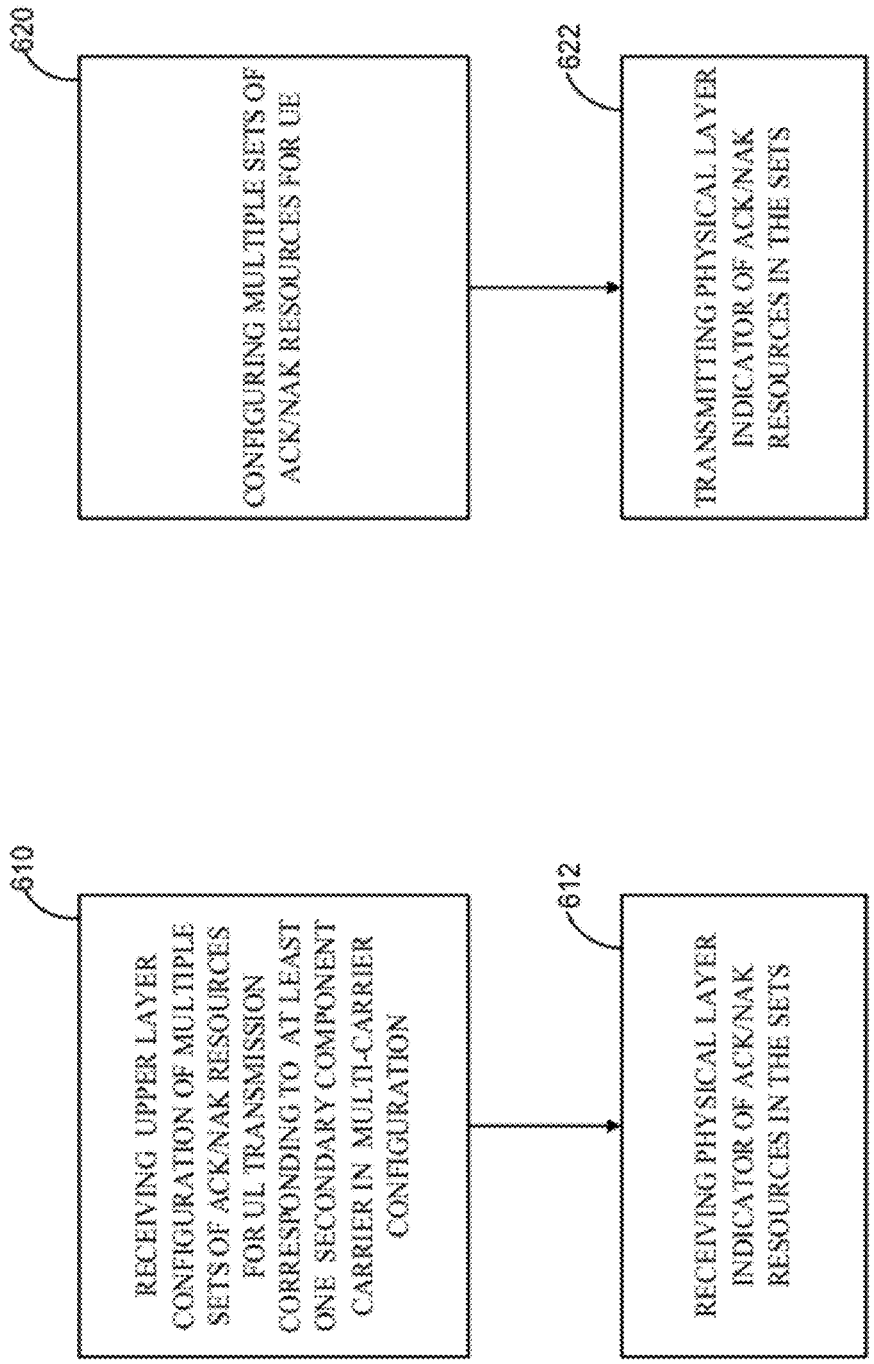

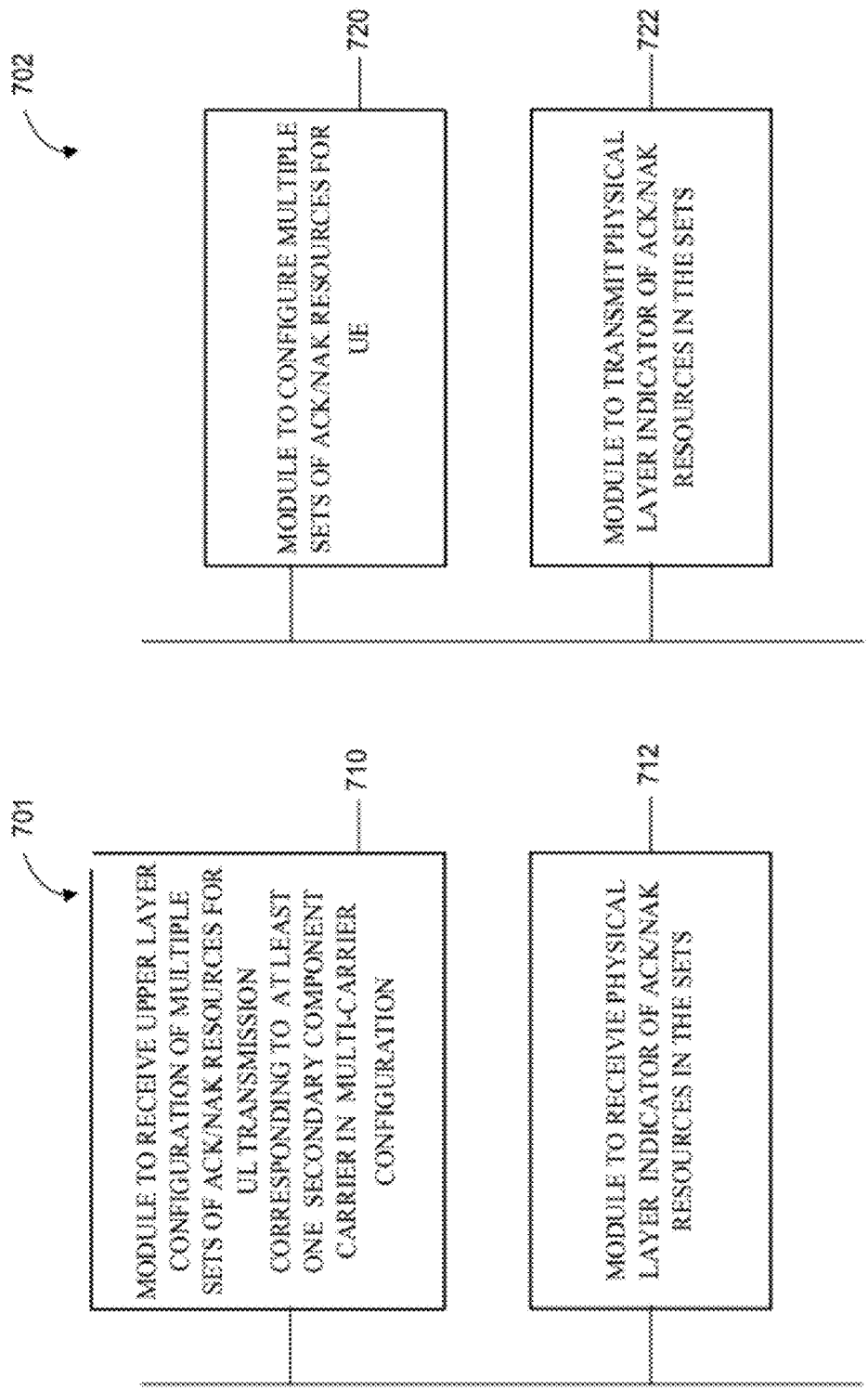

configured set
with offset, where D=offset value
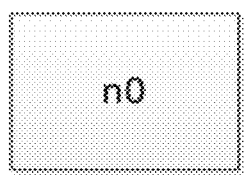
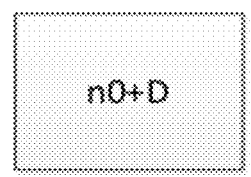
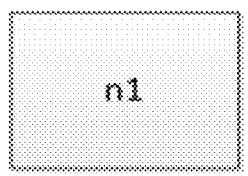
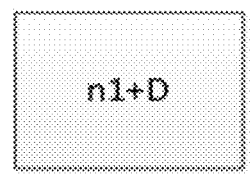
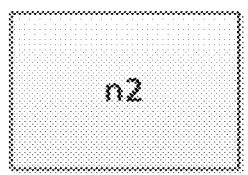
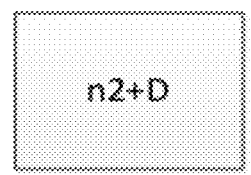
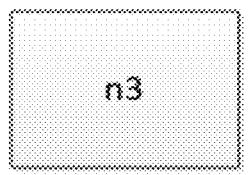
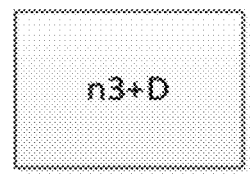
*FIG. 8A*

| ARI: | 00 | 01 | 10 | 11 |
|------|-----|-----|-----|-----|
| Set 1 | n11 | n12 | n13 | n14 |
| Set 2 | n21 | n22 | n23 | n24 |

*FIG. 8B*

| | | | ARI |
|---|---|---|---|
| Set 1 | m11 | m12 | 00 |
| Set 2 | n21 | n22 | 01 |
| Set 3 | n31 | n32 | 10 |
| Set 4 | n41 | n42 | 11 |

*FIG. 8C*

CONTROL CHANNEL RESOURCES FOR MULTI-BIT ACK/NAK

CROSS-REFERENCE TO RELATED APPLICATION

This application claims the benefit under 35 U.S.C. §119(e) to U.S. Provisional Patent Application No. 61/389,678 entitled "CONTROL CHANNEL RESOURCES FOR MULTI-BIT ACK/NAK WITH CARRIER AGGREGATION," filed on Oct. 4, 2010, the disclosure of which is expressly incorporated by reference herein in its entirety.

BACKGROUND

1. Field

Aspects of the present disclosure relate generally to wireless communication systems, and more particularly to supporting ACK/NAK feedback in a Carrier Aggregation (CA) configuration.

2. Background

Wireless communication networks are widely deployed to provide various communication services such as voice, video, packet data, messaging, broadcast, etc. These wireless networks may be multiple-access networks capable of supporting multiple users by sharing the available network resources. A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect, a method of wireless communication is disclosed. The method includes receiving an upper layer configuration of multiple sets of ACK/NAK resources for uplink transmission that correspond to at least one secondary downlink component carrier in a multi-carrier configuration. The method also includes receiving a physical layer indicator of ACK/NAK resources in the sets.

Another aspect discloses a method of wireless communication and includes configuring multiple sets of ACK/NAK resources. A physical layer indicator of ACK/NAK resources is transmitted in the plurality of sets.

In another aspect, an apparatus for wireless communication has a memory and at least one processor coupled to the memory. The processor(s) is configured to receive an upper layer configuration of multiple sets of ACK/NAK resources for uplink transmission that correspond to at least one secondary downlink component carrier in a multi-carrier configuration. The processor(s) is also configured to receive a physical layer indicator of ACK/NAK resources in the sets.

Another aspect discloses wireless communication having a memory and at least one processor coupled to the memory. The processor(s) is configured to configure multiple sets of ACK/NAK resources for a UE. The processor(s) is also configured to transmit a physical layer indicator of ACK/NAK resources in the sets.

In another aspect, an apparatus for wireless communication includes means for receiving an upper layer configuration of multiple sets of ACK/NAK resources for uplink transmission that correspond to at least one secondary downlink component carrier in a multi-carrier configuration. The apparatus also includes means for receiving a physical layer indicator of ACK/NAK resources in the sets.

Another aspect discloses an apparatus including means for configuring multiple sets of ACK/NAK resources for a user equipment (UE). The apparatus also includes means for transmitting a physical layer indicator of ACK/NAK resources in the sets.

Another aspect discloses a computer program product for wireless communications in a wireless network. The computer readable medium has program code recorded thereon which, when executed by the processor(s), causes the processor(s) to perform operations of receiving an upper layer configuration of multiple sets of ACK/NAK resources for uplink transmission that correspond to at least one secondary downlink component carrier in a multi-carrier configuration. The program code also causes the processor(s) to receive a physical layer indicator of ACK/NAK resources in the sets.

In another aspect, a computer program product for wireless communications in a wireless network is disclosed. The computer readable medium has program code recorded thereon which, when executed by the processor(s), causes the processor(s) to perform operations of configuring multiple sets of ACK/NAK resources for a user equipment (UE). The program code also causes the processor(s) to transmit a physical layer indicator of ACK/NAK resources in the sets.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description

FIGS. 6A-6B are block diagrams illustrating a method for using an ACK/NAK resource indicator in a multi-carrier configuration.

FIGS. 7A-7B are block diagrams illustrating components for using an ACK/NAK resource indicator in a multi-carrier configuration.

FIGS. 8A-8C illustrate various examples of using an ACK/NAK resource indicator.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA) and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
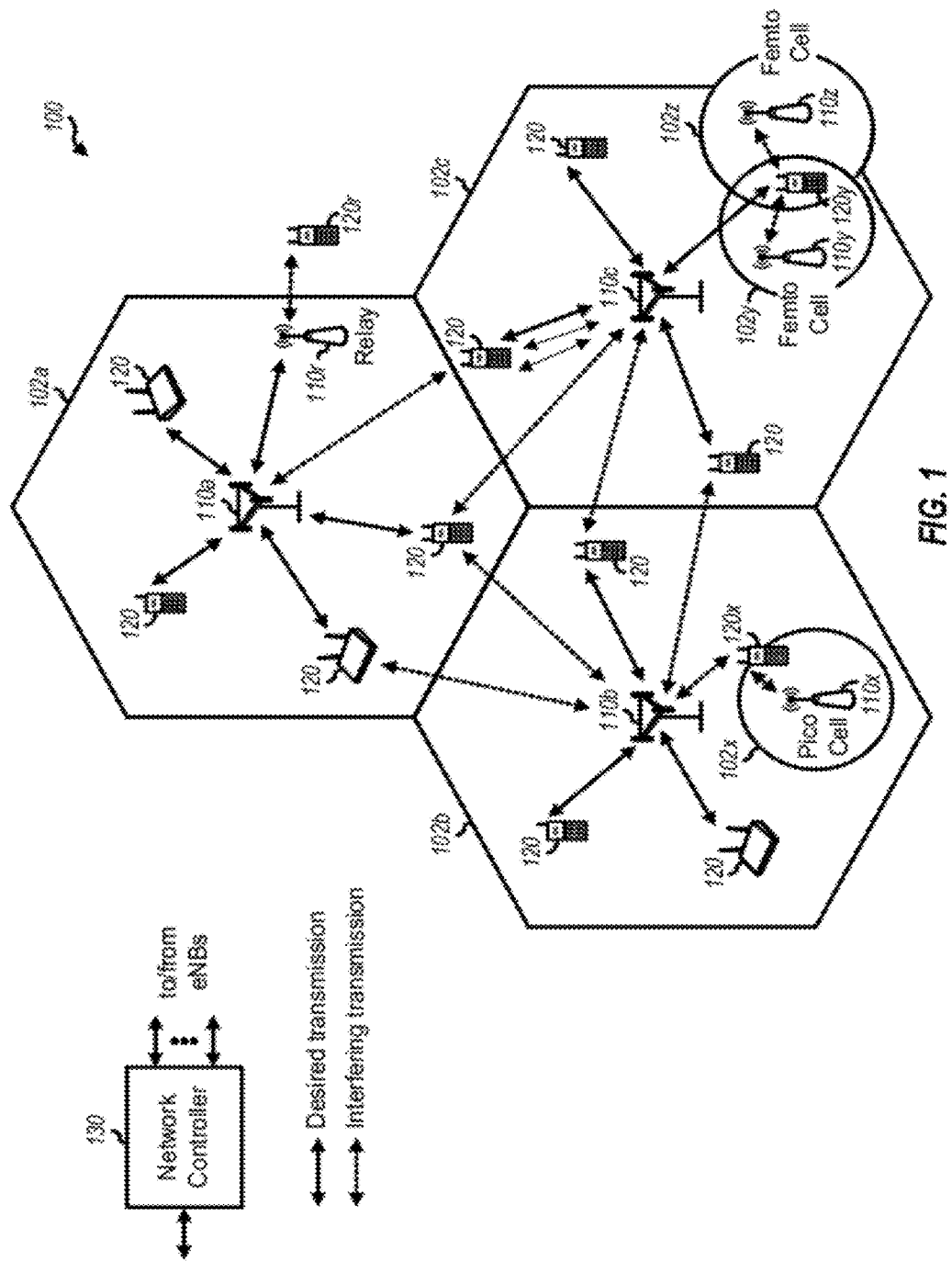
FIG. 1 is a block diagram conceptually illustrating an example of a telecommunications system.

FIG. 1 shows a wireless communication network 100, which may be a multi-carrier LTE-A network in which multi bit ACK/NAK occurs. The wireless network 100 includes a number of evolved node Bs (eNodeBs) 110 and other network entities. An eNodeB may be a station that communicates with the UEs 120 and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

The UE 120 operating in the multicarrier communication network 100 is configured to aggregate certain functions of multiple component carriers, such as control and feedback functions, on the same carrier, which may be referred to as a primary component carrier (PCC). The remaining component carriers that depend on the primary component carrier for support are referred to as associated secondary component carriers (SCCs). The UE 120 may aggregate control functions such as those provided by the optional dedicated channel (DCH), the nonscheduled grants, a physical uplink control channel (PUCCH), and/or a physical downlink control channel (PDCCH). Signaling and payload may be transmitted both on the downlink by the eNode B to the UE, and on the uplink by the UE to the eNodeB.

In some examples, there may be multiple primary component carriers. In addition, secondary component carriers may be added or removed without affecting the basic operation of the UE 120, including physical channel establishment and RLF procedures which are layer 2 and layer 3 procedures, such as in the 3GPP technical specification 36.331 for the LTE RRC protocol.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations.

In one aspect, the wireless network 100 may support Frequency Division Duplex (FDD) or Time Division Duplex (TDD) modes of operation. The techniques described herein may be used for FDD or TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 (e.g., UE 120x, UE 120y, etc.) are dispersed throughout the wireless network 100, and each UE may be stationary or mobile. A UE may also be referred to as a terminal, a user terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a netbook, a smart book, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth.

One aspect is directed to the choice of PUCCH when no PDCCH corresponding to PDSCH on secondary cells is received, and PDSCH is the received at the primary cell. In the system 100, the eNodeB and UE are configured to be able to identify uplink resources when the primary component carrier and secondary component carrier are utilized. The system 100 also provides eNode flexibility and load balancing. additionally, the UE may be configured by radio resource control to improve ACK/NAK resource utilization.

One aspect is directed to the choice of PUCCH when no PDCCH corresponding to PDSCH on secondary cells is received, and PDSCH is the received at the primary cell. In the system 100, the eNodeB and UE are configured to be able to identify uplink resources when the primary component carrier and secondary component carrier are utilized. The system 100 also provides eNode flexibility and load balancing. additionally, the UE may be configured by radio resource control to improve ACK/NAK resource utilization.

Figure 2:
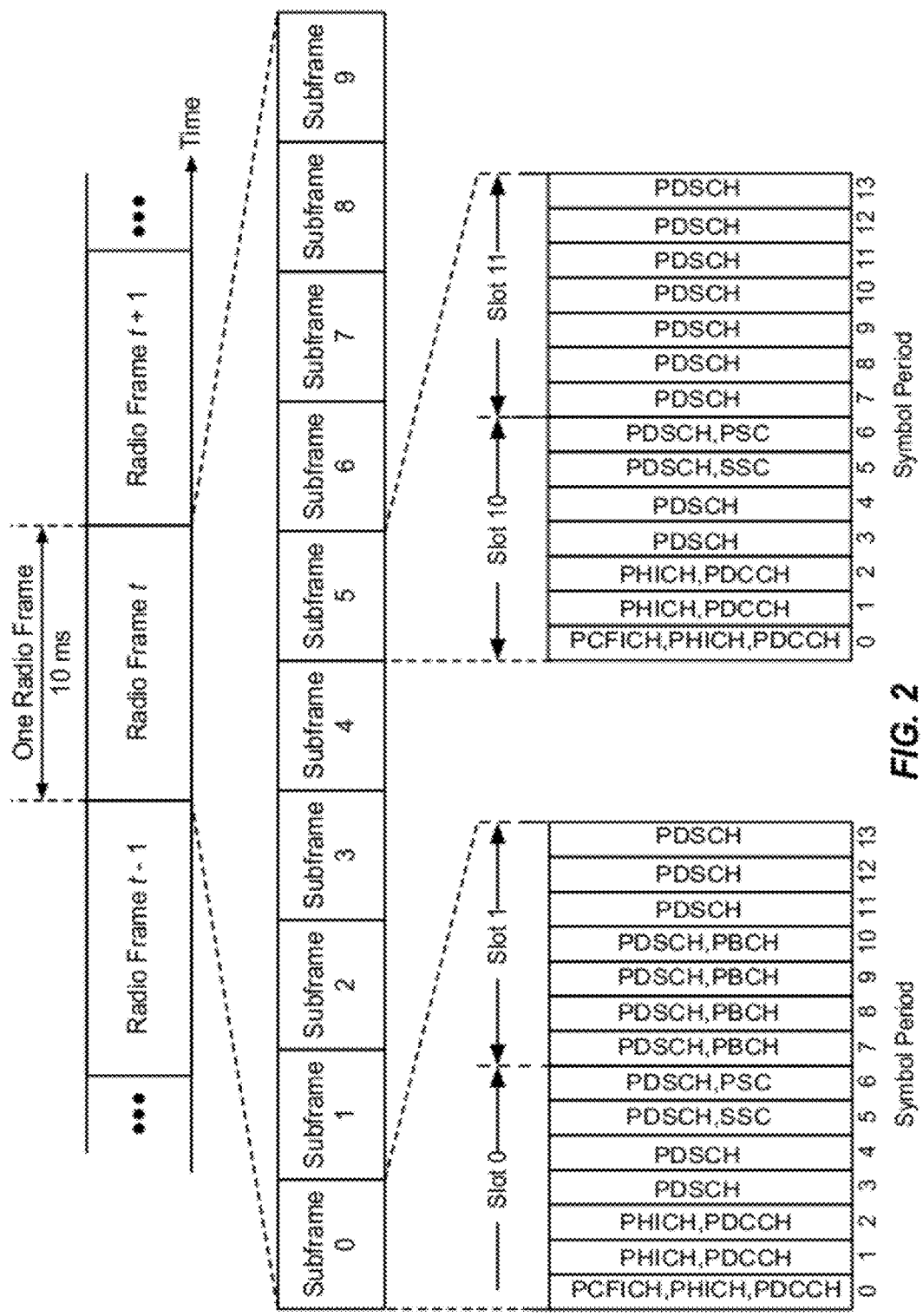
FIG. 2 is a diagram conceptually illustrating an example of a downlink frame structure in a telecommunications system.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In a multicarrier LTE-A system, the UE may be configured with two or more component carriers (CCs). One carrier may be designated as the primary component carrier (PCC). The other carriers may be designated as secondary component carriers (SCCs). Those skilled in the art will appreciate that the component carriers may be referred to by other terms, for example, as primary cell and secondary cell(s).

For a downlink HARQ (hybrid automatic repeat request) operation, the eNodeB receives (or UE provides) feedback for acknowledgments/negative acknowledgements (ACK/NAK) to improve downlink transmissions. If multiple carriers are being supported simultaneously for the UE, then the UE may need to feedback ACK/NAK for two or more downlink carriers.

For a HARQ acknowledgement, the resource index to use is given as a function of the first control channel element (CCE) in the PDCCH used to schedule the downlink transmission to the terminal. Information about the PUCCH resources in the downlink scheduling assignment are not explicitly included, which reduces overhead In addition to dynamic scheduling by using the PDCCH, a terminal (e.g., UE) may be semi-persistently scheduled according to a specific pattern if there is no PDCCH to derive the PUCCH resource index from. Instead, the configuration of the semi-persistent scheduling pattern includes information on the PUCCH index to use for the HARQ acknowledgement. In either of these two cases, a terminal is using PUCCH resources only when it has been scheduled in the downlink.

If the PDSCH transmissions are on the secondary component carriers, and if the PDCCH scheduling the PDSCH on the secondary component carriers is not located on the primary component carrier (i.e., no cross-carrier signaling), then ACK/NAK resources are explicitly configured by upper layers, e.g., radio resource control. Further, if the PDSCH transmissions are on the secondary component carriers, then for cross-carrier scheduling from a primary component carrier, ACK/NAK resources may be implicitly allocated.

In another aspect, PDCCH may initiate semi-persistent scheduling (SPS), explicit and implicit resource allocation, cross-carrier scheduling, and the reuse of transmit power control (TPC) bits in downlink control information (DCI) for secondary component carriers (SCC). For a HARQ acknowledgement, the resource index to use is given as a function of the first control channel element (CCE) in the PDCCH used to schedule the downlink transmission to the terminal. Information about the PUCCH resources is not explicitly included in the downlink scheduling assignment, which reduces overhead.

In addition to dynamic scheduling by using the PDCCH, there is also the possibility to semi-persistently schedule a terminal according to a specific pattern. In this case there is no PDCCH to derive the PUCCH resource index from. Instead, the configuration of the semi-persistent scheduling pattern includes information on the PUCCH index to use for the hybrid-ARQ acknowledgement. In either of these two cases, a terminal is using PUCCH resources only when it has been scheduled in the downlink.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
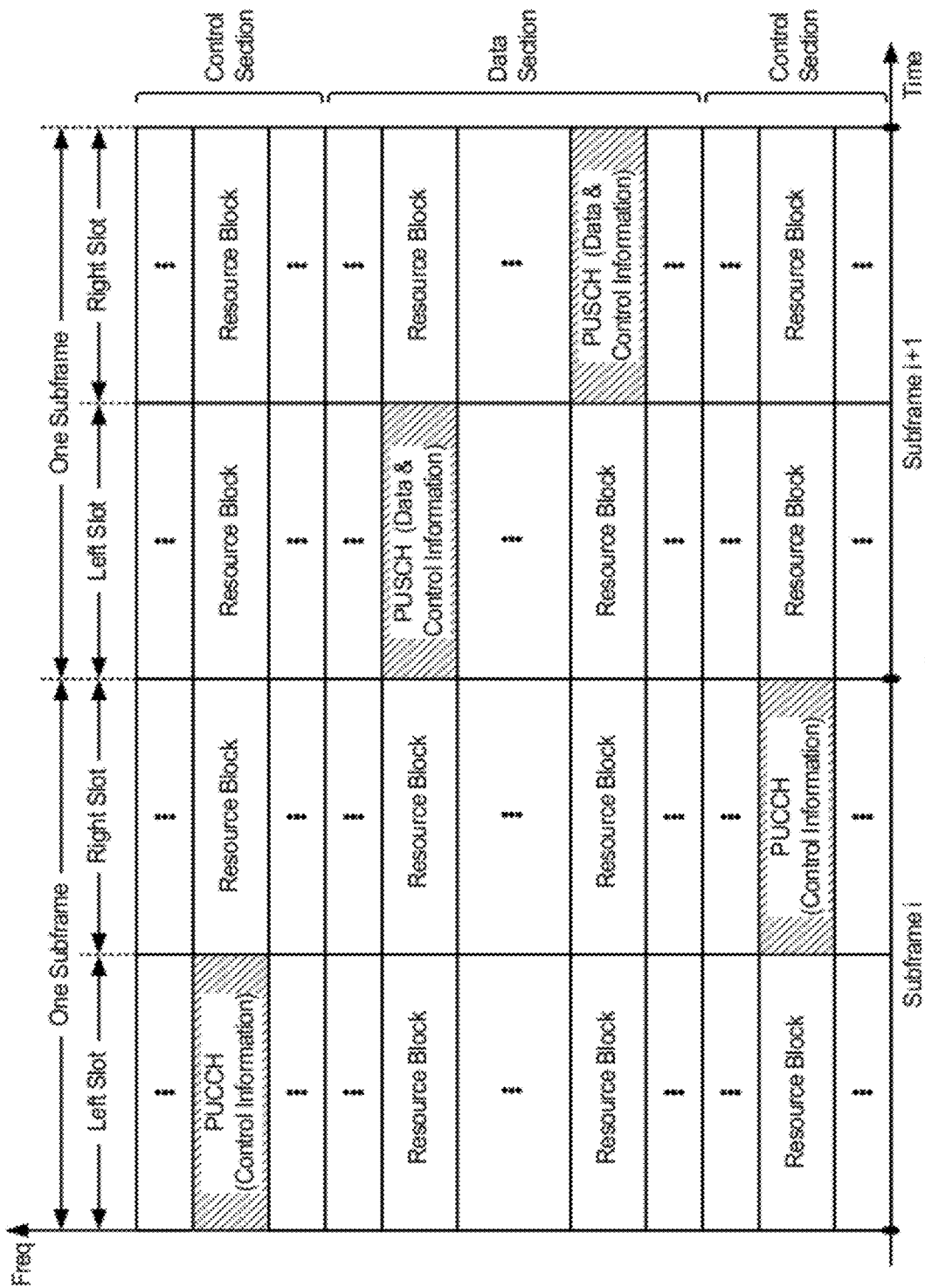
FIG. 3 is a block diagram conceptually illustrating an example frame structure in uplink communications.

FIG. 3 is a block diagram illustrating an exemplary FDD and TDD (non-special subframe only) subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

The uplink control channel may be carried on the primary component carrier. In some configurations, control information for the secondary component carriers is transmitted in the physical layer uplink control channel of the primary component carrier. In other words, the physical uplink control channel (PUCCH) is only present in the primary component carrier.

The transmission of ACK/NAKs for multiple downlink component carriers can be from one single uplink control channel, namely, the uplink primary component carrier. As a result, the ACK/NAK feedback overhead on the uplink primary component carrier may be significantly larger than the overhead of previous technologies. For example, previous technologies may support up to two ACK/NAK bits. However, in a case of 5 (five) component carriers in an FDD system with each carrier configured in MIMO transmission mode, there may be up to 10-bits of ACK/NAK feedback on the uplink primary component carrier to acknowledge downlink transmission in a particular subframe.

The transmission of ACK/NAK via PUCCH utilizes a resource, such as, but not limited to a certain resource block, a cyclic shift, an orthogonal cover, and/or a combination thereof. The ACK/NAK or PUCCH resource may be derived either implicitly or explicitly. Implicit ACK/NAK resource allocation is based upon downlink control transmission. Explicit resource allocation is configured by radio resource control (RRC) for some explicit ACK/NAK resources. For example, the UE is configured and then directed as to which resources to use. In particular, for PUCCH resource allocation, if the UE is configured for channel selection, and the PDSCH (physical downlink shared channel) transmission is on the primary component carrier, then the ACK/NAK resources are implicitly allocated for dynamic scheduling. If the PDSCH transmissions are on the secondary component carriers, and if the PDCCH scheduling the PDSCH on the secondary component carriers is not located on the primary component carrier (i.e., no cross-carrier signaling), then ACK/NAK resources are explicitly configured by upper layers, e.g., radio resource control. Further, if the PDSCH transmissions are on the secondary component carriers, then for cross-carrier scheduling from a primary component carrier, ACK/NAK resources may be implicitly allocated.

For downlink carrier aggregation, there can be multiple simultaneous downlink supplemental channels (DL-SCHs) scheduled for a single terminal, one for each downlink component carrier and, consequently, multiple acknowledgement bits are conveyed in the uplink (one, or two in the case of spatial multiplexing, for each downlink component carrier). PUCCH format 1b may be used to support more than two bits in the uplink by using resource selection. If four bits are to be transmitted in the uplink, then with resource selection, two bits indicate which PUCCH resource to use while the remaining two bits are transmitted using the normal PUCCH structure but on the resource pointed to by the first two bits. In total, four PUCCH resources are needed. One resource is derived from the first control channel element (CCE) using the same rule as in the absence of carrier aggregation (assuming that the scheduling assignment is transmitted on, and relating to, the primary component carrier). The remaining resources are semi-statically configured by radio resource control (RRC) signaling.

A UE may be assigned resource blocks in the control section to transmit control information to an eNodeB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

The PSC (primary synchronization carrier), SSC (secondary synchronization carrier), CRS (common reference signal), PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 4:
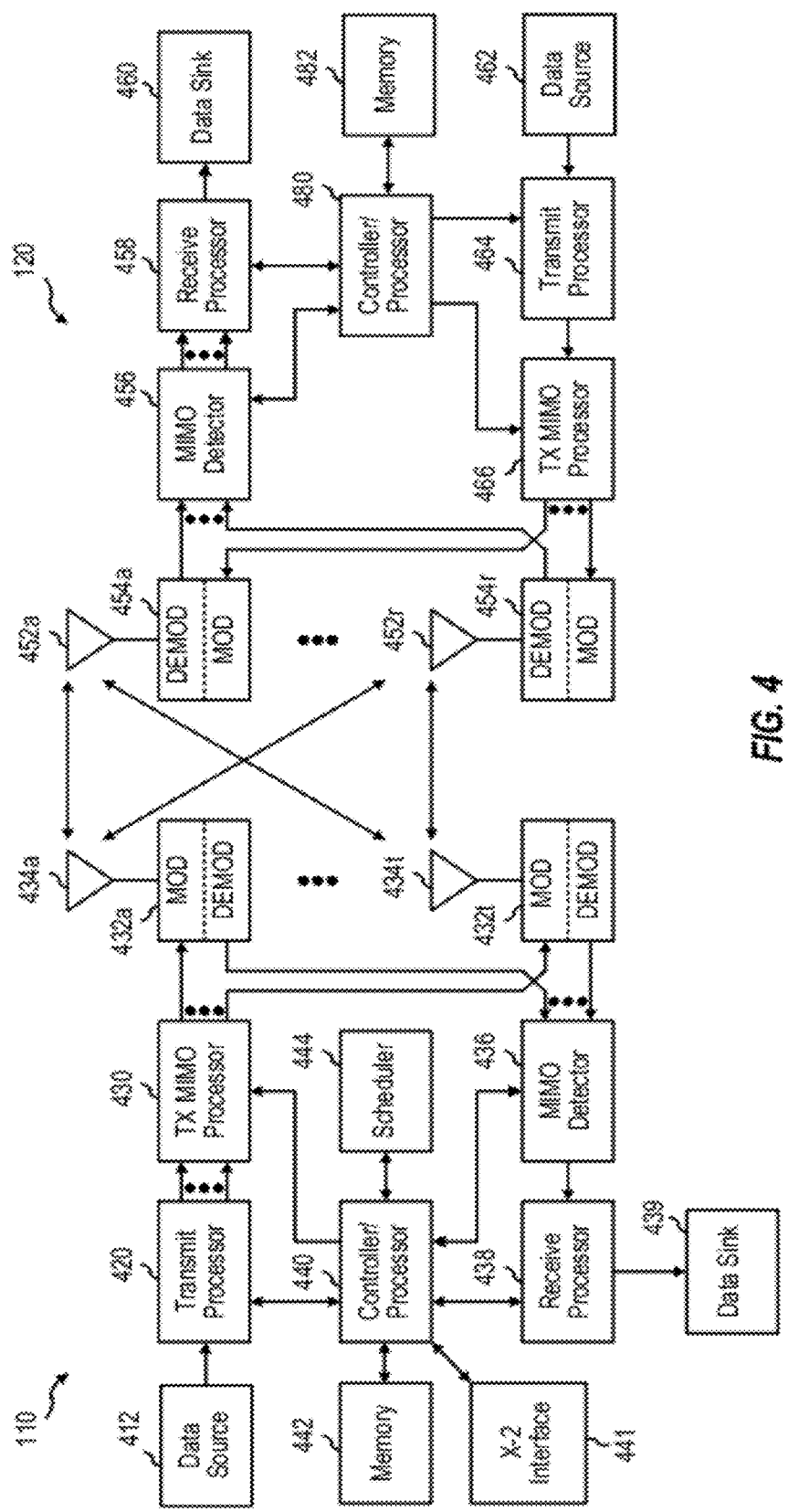
FIG. 4 is a block diagram conceptually illustrating a design of a base station/eNodeB and a UE configured according to an aspect of the present disclosure.

FIG. 4 shows a block diagram of a design of a base station/eNodeB 110 and a UE 120, which may be one of the base stations/eNodeBs and one of the UEs in FIG. 1. For example, the base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

In one aspect, components of the UE 120, such as the controller/processor 480, receive processor 458, MIMO detector 456, demodulators 454a-454r and/or antenna 452a-452r may be used in receiving downlink transmissions.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of the functional blocks illustrated in use FIGS. 6A-B, and/or other processes for the techniques described herein. The memories 442 and 482 may store data and program codes for the base station 110 and the UE 120, respectively. A scheduler 444 may schedule UEs for data transmission on the downlink and/or uplink.

Carrier Aggregation

LTE-Advanced UEs use spectrum in up to 20 Mhz bandwidths allocated in a carrier aggregation of up to a total of 100 Mhz (5 component carriers) used for transmission in each direction. Generally, less traffic is transmitted on the uplink than the downlink, so the uplink spectrum allocation may be smaller than the downlink allocation. For example, if 20 Mhz is assigned to the uplink, the downlink may be assigned 100 Mhz. These asymmetric FDD assignments will conserve spectrum and are a good fit for the typically asymmetric bandwidth utilization by broadband subscribers.

Carrier Aggregation Types

Figure 5A:
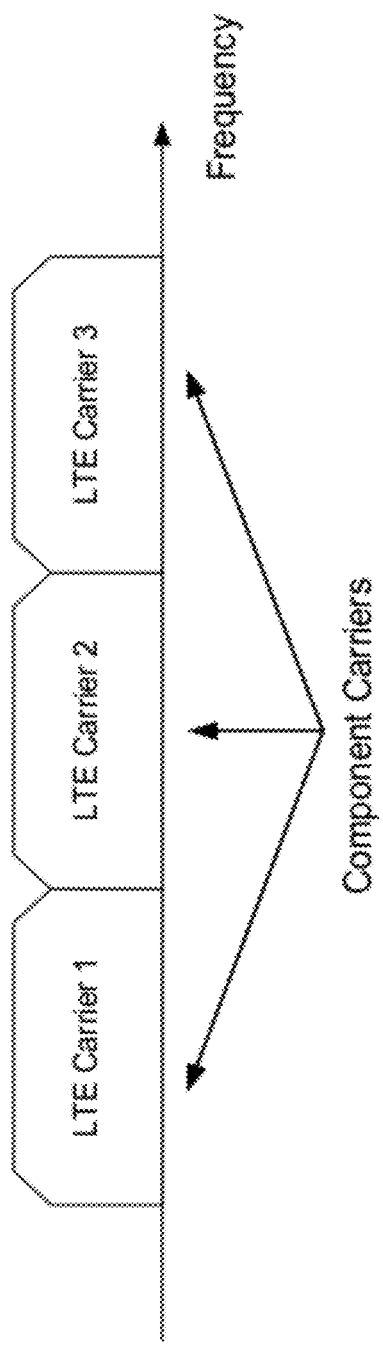
FIG. 5A discloses a continuous carrier aggregation type.
Figure 5B:
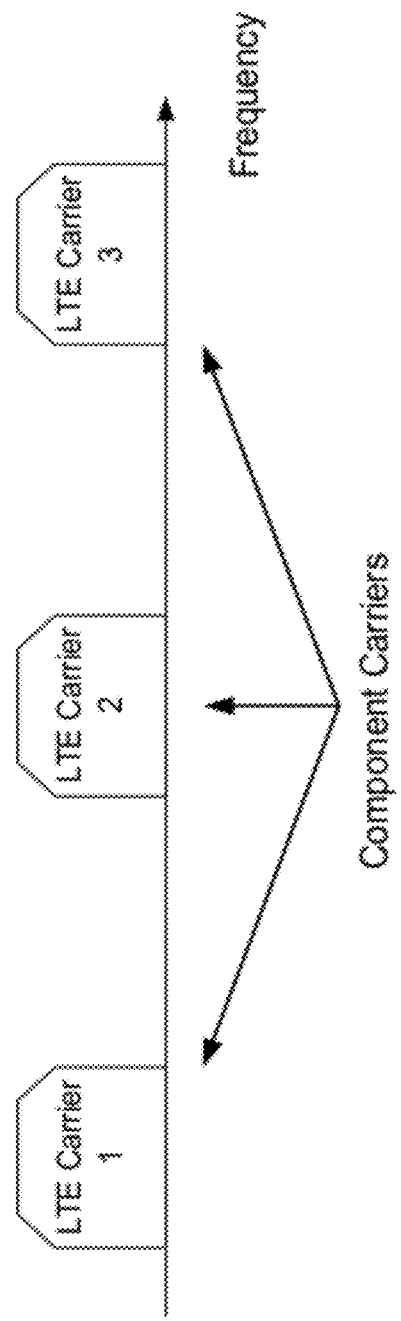
FIG. 5B discloses a non-continuous carrier aggregation type.

For the LTE-Advanced mobile systems, two types of carrier aggregation (CA) methods have been proposed, continuous carrier aggregation and non-continuous carrier aggregation. They are illustrated in FIGS. 5A and 5B. Non-continuous carrier aggregation occurs when multiple available component carriers are separated along the frequency band (FIG. 5B). On the other hand, continuous carrier aggregation occurs when multiple available component carriers are adjacent to each other (FIG. 5A). Both non-continuous and continuous carrier aggregation aggregate multiple LTE/component carriers to serve a single unit of LTE Advanced UE.

Multiple RF receiving units and multiple FFTs may be deployed with non-continuous carrier aggregation in LTE-Advanced UE since the carriers are separated along the frequency band. Because non-continuous carrier aggregation supports data transmissions over multiple separated carriers across a large frequency range, propagation path loss, Doppler shift and other radio channel characteristics may vary a lot at different frequency bands.

Thus, to support broadband data transmission under the non-continuous carrier aggregation approach, methods may be used to adaptively adjust coding, modulation and transmission power for different component carriers. For example, in an LTE-Advanced system where the enhanced NodeB (eNodeB) has fixed transmitting power on each component carrier, the effective coverage or supportable modulation and coding of each component carrier may be different.

Control Signaling

In general, there are three different approaches for deploying control channel signaling for multiple component carriers. The first involves a minor modification of the control structure in LTE systems where each component carrier is given its own coded control channel.

The second method involves jointly coding the control channels of different component carriers and deploying the control channels in a dedicated component carrier. The control information for the multiple component carriers will be integrated as the signaling content in this dedicated control channel. As a result, backward compatibility with the control channel structure in LTE systems is maintained, while signaling overhead in the carrier aggregation is reduced.

Multiple control channels for different component carriers are jointly coded and then transmitted over the entire frequency band formed by a third carrier aggregation method. This approach offers low signaling overhead and high decoding performance in control channels, at the expense of high power consumption at the UE side. However, this method is not compatible with LTE systems.

To improve ACK/NAK resource utilization, a UE may be configured by radio resource control (RRC) with multiple resources on a semi-static basis. The UE may receive dynamic indications via downlink control information (DCI) as to which resource to use. For example, in LTE Rel-8, for semi-persistent scheduling (SPS), one explicit ACK/NAK resource is required. Instead, a UE may be configured with four ACK/NAK resources by radio resource control. Upon semi-persistent scheduling activation via PDCCH, the 2-bit transmission power control (TPC) command in the downlink control information is re-interpreted to indicate which one of the four resources is to be used for the activated duration This provides improved statistical multiplexing of ACK/NAK resources and hence improved uplink resource efficiency.

In LTE-A carrier aggregation, two or more explicit ACK/NAK resources (N>2) may be used. To improve ACK/NAK resource efficiency, instead of semi-statically configuring N resources by radio resource control, the base station can semi-statically configure additional (M>N) resources. The base station can inform the UE via downlink control information (DCI) which N resources from the set of M resources should be used in a particular subframe. The information field in the downlink control information (e.g., the physical layer indicator) can be designated as the ACK/NAK resource indicator, or ARI. The ACK/NAK resource indicator may or may not increase the downlink control information format size.

In one configuration, four ACK/NAK resources may be allocated on PUCCH by the base station and used to acknowledge downlink transmissions. In one aspect, at least some of the four resources are not explicitly derived. Rather, some of the resources are derived implicitly. When PUCCH Format 1b based channel selection is used, up to four (4) ACK/NAK bits may be supported. In an example where there are two (2) configured component carriers and both are associated with a downlink MIMO (downlink multiple input multiple output) operation, then four (4) ACK/NAK resources convey four (4) ACK/NAK bits using the PUCCH format 1b (e.g., two bits ACK/NACK UCI payload+two bits via channel selection). Depending on the number of detected PDCCHs (e.g., 0 to 2) from the primary component carrier and the design of the ACK/NAK mapping table, some ACK/NAK resources (e.g., 2 or more) may be explicitly configured by radio resource control.

When the ACK/NAK resource indicator is supported for PUCCH format 1b based channel selection, two or more resources (denoted by N) may be indicated by the downlink control information, where the 2-bit transmission power control (TPC) command in the downlink control information is reused for the secondary component carriers. The transmission power control field in the downlink control information format of a corresponding PDCCH may be used to determine the PUCCH resource values from one of four resource values configured by the higher layers.

In one aspect, a method of indicating the N resources includes configuring a set of M>N ACK/NAK resources via the radio resource control, and indicating via the ACK/NAK resource indicator, four possible combinations of N resources from the set of the M resources.

Alternately, N ACK/NAK resources may be configured via the radio resource control, and the ACK/NAK resource indicator indicates possible offsets relative to the configured set for the UE to determine a set of N resources for use, as illustrated in FIG. 8A.

According to an aspect of the present disclosure, the base station configures N sets of ACK/NAK resources via upper layer signaling, e.g., radio resource control messages, where N is the number of explicitly signaled resources needed. In one example, each set has up to four resources (in the case of two bits in the downlink control information). The ACK/NAK resource indicator can indicate for each set one of the four resources. In other words, an (physical layer) index of resources is provided for each individually configured set, to indicate the resources from each set. For example, the physical layer index may be signaled utilize two bits of the TPC command for SCC, or it could be signaled by reinterpreting other bits in a corresponding PDCCH transmission. Based on the ACK/NAK resource indicator, the UE can determine uplink resources for transmitting ACK/NAK on the PUCCH for the primary comment carrier and the secondary component carrier. In another configuration, the indication is only for determining resources for acknowledging downlink transmissions on the secondary component carrier, with the primary component carrier ACK/NAK being transmitted on implicitly derived resources.

For example, as illustrated in FIG. 8B, where N=2, the radio resource control configures two sets of ACK/NAK resources, each set having four resources. The two sets may be described as follows:

Set 1: {n11, n12, n13, n14}; and Set 2: {n21, n22, n23, n24}.

A 2-bit ARI indicates one resource from each of Set 1 and Set 2, as described below:

ARI=00, n11 and n21;
ARI=01, n12 and n22;
ARI=10, n13 and n23; and
ARI=11, n14 and n24.

In another configuration, up to four sets of resources can be configured (in the case of two bits in the downlink control information), where each set has N resources. The ARI indicates one set of the ACK/NAK resources.

For example, where N=2, as illustrated in FIG. 8C, the upper layer signaling configures four sets of ACK/NAK resources, each with two resources. The four sets of ACK/NAK resources may be described as follows:

Set 1: {n11, n12};
Set 2: {n21, n22};
Set 3: {n31, n32}; and
Set 4: {n41, n42}.

A 2-bit ARI indicates one of the four sets, as described below.

ARI=00, set 1;
ARI=01, set 2;
ARI=10, set 3; and
ARI=11, set 4.

For each of the above examples, N=2. Those skilled in the art will appreciate that other N values may be used. Additionally, the value of N (the number of explicit ACK/NAK resources) might not directly correspond with the number of configured component carriers and the configured transmission mode for each component carrier for a given UE because some of the resources may be implicitly derived. In particular, in some cases, some A/N resources may be implicitly derived from the control channel element (CCE) indices of the PDCCHs on the primary component carrier. The other A/N resources will be signaled via the ARI. Additionally, one aspect includes explicit ACK/NAK resource allocation (i.e., N>0), where the value of N may be fixed at two. This is in contrast to an alternative configuration, where N may be adapted to the number of configured component carriers and/or configured downlink transmission mode for each component carrier. For example, instead of having N=2 for two component carriers (CCs) and 2-bit ACK/NAK for both component carriers (CCs), and N=3 for four (4) component carriers (CCs) and 1-bit ACK/NAK for all four (4) component carriers (CCs), the value of N can be two for both cases.

These configurations provide an eNodeB with flexibility in managing ACK/NAK resources. Both orthogonal and non-orthogonal set of resources may be configured among the N sets for a UE and/or across different UEs to allow for a trade off between scheduling flexibility and ACK/NAK overhead. For example, orthogonal resources may be configured so there will be few limitations on the scheduling. Alternatively, some overlapped sets of resources may be configured within a UE or across different UEs to reduce ACK/NAK overhead.

According to the present disclosure, the eNodeB can adjust the resources for a UE by sending a different ACK/NAK resource indicator value based on current loading conditions. For example, the eNodeB can independently adjust resources (e.g., more or less orthogonality) based on the number of UEs in the system and/or the number of UEs configured for the multicarrier system. Further, the eNodeB can adjust between orthogonal and non-orthogonal based selections.

Employing the ACK/NAK resource indicator in this fashion simplifies operation. For example, if a UE is scheduled on two component carriers, both with MIMO mode, then there are a total of four bits of ACK/NAK feedback, which results from two bits feedback for each of the two component carriers, and thus N=2. If a UE is configured with four component carriers, all with single input multiple output (SIMO) mode, then there are also four bits of ACK/NAK feedback, which results from one bit of feedback for each of the four component carriers, and N=2 as well.

According to an aspect of the present disclosure, the 2-bit transmission power control command carried in the downlink control information of secondary component carriers(s), is re-interpreted as an ACK/NAK resource indicator if N>0. If N=0, then the command is reserved. In one aspect, the 2-bit transmission power control command is not used for power control regardless of the value of N. In another configuration, only the transmission power control command from secondary component carriers is re-interpreted as the ACK/NAK resource indicator. If multiple secondary component carriers exist, they should provide consistent ACK/NAK resource indicators (i.e., overloaded TPC bits.) Those skilled in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

FIG. 6A illustrates an example configuration directed to utilizing the ACK/NAK resource indicator in a multi-carrier configuration. To support the ACK/NAK resource indicator, N explicit ACK/NAK resources are needed. In FIG. 6A, in block 610, the UE receives an upper layer configuration of N sets of ACK/NAK resources for uplink transmission. The ACK/NAK resources enable HARQ feedback for one or more secondary downlink component carriers in a multi-carrier configuration. The resources can also be used for HARQ feedback for a primary downlink component carrier. In block 612, a physical layer indicator is received, which indicates ACK/NAK resources from each of the sets.

FIG. 6B illustrates an example configuration directed to utilizing the ACK/NAK resource indicator in a multi-carrier configuration. In block 620, the eNodeB configures multiple sets of ACK/NAK resources for a UE. In block 622, the eNodeB transmits a physical layer indicator of the ACK/NAK resources in the sets.

In one configuration, the UE 120 is configured for wireless communication including means for receiving an upper layer configuration. In one aspect, the receiving means may be the antenna 452a-452r, demodulators 454a-454r, receive processor 458, controller/processor 480 and/or memory 482 configured to perform the functions recited by the receiving. The UE 120 is also configured to include a means for receiving a physical layer indicator. In one aspect, the receiving means may be the antenna 452a-452r, demodulators 454a-454r, receive processor 458, controller/processor 480 and/or memory 482 configured to perform the functions recited by the receiving. In another aspect, the aforementioned means may be a module or any apparatus configured to perform the functions recited by the aforementioned means.

In one configuration, the eNodeB 110 is configured for wireless communication including means for configuring. In one aspect, the configuring means may be the controller processor 440 and memory 442 configured to perform the functions recited by the configuring means. The eNodeB 110 is also configured to include means for transmitting. In one aspect, the transmitting means may be the transmit processor 420, transmit MIMO processor 430, modulators 432*a-t* and antenna 434*a*-434*t* configured to perform the functions recited by the transmitting means. In another aspect, the aforementioned means may be a module or any apparatus configured to perform the functions recited by the aforementioned means.

FIG. 7A shows a design of an apparatus 701 for a UE, such as the UE 120 of FIG. 4. The apparatus 701 includes a module 710 for receiving an upper layer configuration of multiple sets of ACK/NAK resources for uplink transmission that correspond to at least one secondary component carrier in a multi-carrier configuration. The apparatus also includes a module 712 to receive a physical layer indicator of the ACK/NAK resources in the sets. The modules in FIG. 7A may be processors, electronics devices, hardware devices, electronics components, logical circuits, memories, software codes, firmware codes, etc., or any combination thereof.

FIG. 7B shows a design of an apparatus 702 for an eNodeB, such as the eNodeB 110 of FIG. 4. The apparatus 702 includes a module 720 for configuring multiple sets of ACK/NAK resources. The apparatus 702 also includes a module 722 for transmitting a physical layer indicator of ACK/NAK resources in the sets. The modules in FIG. 7B may be processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, then the coaxial cable, fiber optic cable, twisted pair, or DSL are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
receiving an upper layer configuration of a plurality of sets of ACK/NAK resources for uplink transmission corresponding to at least one secondary downlink component carrier in a multi-carrier configuration, the plurality of sets of ACK/NAK resources being determined based at least in part on a transmission mode of the secondary downlink component carrier;
receiving a physical layer indicator of ACK/NAK resources in the plurality of sets, the physical layer indicator comprising index for the plurality of sets;
determining first ACK/NAK resources from the plurality of sets based at least in part on a control channel element (CCE) of the primary component carrier; and
determining second ACK/NAK resources from the plurality of sets based at least in part on an element of each set corresponding to the index.

2. The method of claim 1, further comprising:
receiving a downlink data transmission on a primary component carrier and the secondary component carrier; and
sending ACK/NAK information for the downlink data transmission on a physical uplink control channel using the ACK/NAK resources.

3. The method of claim 1, further comprising receiving the physical layer indicator as a cross-carrier signal.

4. The method of claim 3, in which the physical layer indicator comprises a transmit power control (TPC) command for the secondary component carrier.

5. The method of claim 1, in which the physical layer indicator comprises an offset into the plurality of sets.

6. The method of claim 1, in which the physical layer indicator supports physical uplink control channel (PUCCH) format 1b based channel selection.

7. The method of claim 1, in which the physical layer indicator comprises transmission power control bits of a physical downlink control channel (PDCCH) secondary component carrier.

8. The method of claim 1, in which the upper layer comprises a radio resource control (RRC) layer.

9. The method of claim 1, in which the plurality of sets is based on a number of downlink component carriers configured for a user equipment (UE) and a transmission mode of the UE.

10. The method of claim 1, in which each set comprises a number of resources based on a number of downlink control information bits.

11. The method of claim 1, in which the physical layer indicator comprises an ACK/NAK resource indicator (ARI).

12. The method of claim 1, in which the plurality of sets of ACK/NAK resources for uplink transmission correspond to a primary downlink component carrier.

13. A method of wireless communication, comprising:
configuring a plurality of sets of ACK/NAK resources for a user equipment (UE) based at least in part on a transmission mode of a secondary downlink component carrier; and
transmitting a physical layer indicator of ACK/NAK resources in the plurality of sets, the physical layer indicator comprising an index for the plurality of sets, in which:
first ACK/NAK resources are indicated from the plurality of sets based at least in part on a control channel element (CCE) of the primary component carrier, and
second ACK/NAK resources are indicated from the plurality of sets based at least in part on an element of each set corresponding to the index.

14. The method of claim 13, in which the configuring comprises implicitly configuring ACK/NAK resources based upon a downlink control transmission.

15. An apparatus for wireless communication, comprising:
a memory; and
at least one processor coupled to the memory, the at least one processor being configured:
to receive an upper layer configuration of a plurality of sets of ACK/NAK resources for uplink transmission corresponding to at least one secondary downlink component carrier in a multi-carrier configuration, the plurality of sets of ACK/NAK resources being determined based at least in part on a transmission mode of the secondary downlink component carrier;
to receive a physical layer indicator of ACK/NAK resources in the plurality of sets, the physical layer indicator comprising an index for the plurality of sets;
to determine first ACK/NAK resources from the plurality of sets based at least in part on a control channel element (CCE) of the primary component carrier; and
to determine second ACK/NAK resources from the plurality of sets based at least in part on an element of each set corresponding to the index.

16. The apparatus of claim 15, in which the processor is further configured:
to receive a downlink data transmission on a primary component carrier and the secondary component carrier; and
to send ACK/NAK information for the downlink data transmission on a physical uplink control channel using the ACK/NAK resources.

17. The apparatus of claim 15, further comprising receiving the physical layer indicator as a cross carrier signal.

18. The apparatus of claim 17, in which the physical layer indicator comprises a transmit power control (TPC) command for the secondary component carrier.

19. The apparatus of claim 15, in which the physical layer indicator comprises an offset into the plurality of sets.

20. The apparatus of claim 15, in which the physical layer indicator supports physical uplink control channel (PUCCH) format 1b based channel selection.

21. The apparatus of claim 15, in which the physical layer indicator comprises transmission power control bits of a physical downlink control channel (PDCCH) secondary component carrier.

22. The apparatus of claim 15, in which the upper layer comprises a radio resource control (RRC) layer.

23. The apparatus of claim 15, in which the plurality of sets is based on a number of downlink component carriers configured for a user equipment (UE) and a transmission mode of the UE.

24. The apparatus of claim 15, in which each set comprises a number of resources based on a number of downlink control information bits.

25. The apparatus of claim 15, in which the physical layer indicator comprises an ACK/NAK resource indicator (ARI).

26. The apparatus of claim 15, in which the plurality of sets of ACK/NAK resources for uplink transmission correspond to a primary downlink component carrier.

27. An apparatus for wireless communication, comprising:
a memory; and
at least one processor coupled to the memory, the at least one processor being configured:
to configure a plurality of sets of ACK/NAK resources for a user equipment (UE) based at least in part on a transmission mode of a secondary downlink component carrier; and to transmit a physical layer indicator of ACK/NAK resources in the plurality of sets, the physical layer indicator comprising an index for the plurality of sets, in which:
first ACK/NAK resources are indicated from the plurality of sets based at least in part on a control channel element (CCE) of the primary component carrier, and
second ACK/NAK resources are indicated from the plurality of sets based at least in part on an element of each set corresponding to the index.

28. The apparatus of claim 27, in which the processor is further configured to implicitly configure ACK/NAK resources based upon a downlink control transmission.

29. An apparatus for wireless communication, comprising:
means for receiving an upper layer configuration of a plurality of sets of ACK/NAK resources for uplink transmission corresponding to at least one secondary downlink component carrier in a multi-carrier configuration, the plurality of sets of ACK/NAK resources being determined based at least in part on a transmission mode of the secondary downlink component carrier;

means for receiving a physical layer indicator of ACK/NAK resources in the plurality of sets, the physical layer indicator comprising an index for the plurality of sets;

means for determining first ACK/NAK resources from the plurality of sets based at least in part on a control channel element (CCE) of the primary component carrier; and means for determining second ACK/NAK resources from the plurality of sets based at least in part on an element of each set corresponding to the index.

30. An apparatus for wireless communication, comprising:

means for configuring a plurality of sets of ACK/NAK resources for a user equipment (UE) based at least in part on a transmission mode of a secondary downlink component carrier; and means for transmitting a physical layer indicator of ACK/NAK resources in the plurality of sets, the physical layer indicator comprising an index for the plurality of sets, in which:

first ACK/NAK resources are indicated from the plurality of sets based at least in part on a control channel element (CCE) of the primary component carrier, and second ACK/NAK resources are indicated from the plurality of sets based at least in part on an element of each set corresponding to the index.

31. A computer program product for wireless communication in a wireless network, comprising:

a non-transitory computer-readable medium having non-transitory program code recorded thereon, the program code comprising:

program code to receive an upper layer configuration of a plurality of sets of ACK/NAK resources for uplink transmission corresponding to at least one secondary downlink component carrier in a multi-carrier configuration, the plurality of sets of ACK/NAK resources being determined based at least in part on a transmission mode of the secondary downlink component carrier;

program code to receive a physical layer indicator of ACK/NAK resources in the plurality of sets, the physical layer indicator comprising an index for the plurality of sets;

program code to determine first ACK/NAK resources from the plurality of sets based at least in part on a control channel element (CCE) of the primary component carrier; and program code to determine second ACK/NAK resources from the plurality of sets based at least in part on an element of each set corresponding to the index.

32. A computer program product for wireless communication in a wireless network, comprising:

a non-transitory computer-readable medium having non-transitory program code recorded thereon, the program code comprising:

program code to configure a plurality of sets of ACK/NAK resources for a user equipment (UE) based at least in part on a transmission mode of a secondary downlink component carrier; and program code to transmit a physical layer indicator of ACK/NAK resources in the plurality of sets, the physical layer indicator comprising an index for the plurality of sets, in which:

first ACK/NAK resources are indicated from the plurality of sets based at least in part on a control channel element (CCE) of the primary component carrier, and second ACK/NAK resources are indicated from the plurality of sets based at least in part on an element of each set corresponding to the index.

* * * * *